Figure 1:
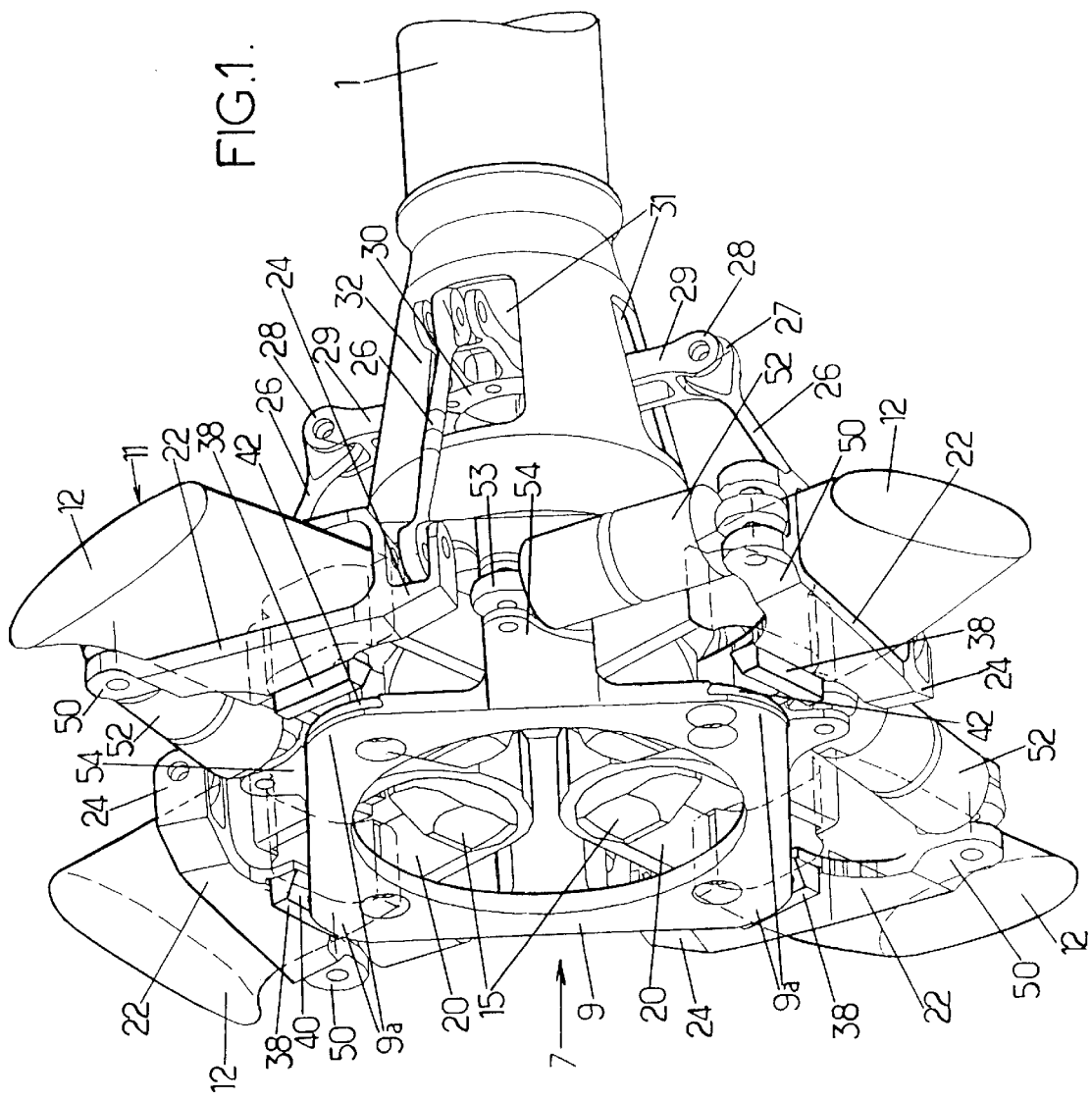

United States Patent [19]
Garcin et al.

[11] Patent Number: 6,120,251
[45] Date of Patent: Sep. 19, 2000

[54] ROTORCRAFT ROTOR WITH FIXED FLAP STOPS ON BLADES AND HUB, AND WITH DETERMINED PITCH-FLAP LAW

[75] Inventors: Sylvie Garcin, Carry-le-Rouet; Etienne Jean Rampal, Marseilles, both of France

[73] Assignee: Eurocopter, France

[21] Appl. No.: 09/096,153

[22] Filed: Jun. 11, 1998

[30] Foreign Application Priority Data

Jun. 13, 1997 [FR] France .................................. 97-07333

[51] Int. Cl.⁷ .................................................. B64C 27/32

[52] U.S. Cl. ....................................... 416/134 A; 416/140

[58] Field of Search .............................. 416/134 A, 140, 416/153, 141, 106, 107

[56] References Cited

U.S. PATENT DOCUMENTS

| | | | |
|---|---|---|---|
| 3,778,189 | 12/1973 | Ferris | 416/140 |
| 4,652,210 | 3/1987 | Leman et al. | 416/140 |
| 5,267,833 | 12/1993 | Mouille | 416/107 |

FOREIGN PATENT DOCUMENTS 2 041 310  9/1980  United Kingdom.

*Primary Examiner*—Edward K. Look
*Assistant Examiner*—Rhonda Barton
*Attorney, Agent, or Firm*—Piper Marbury Rudnick & Wolfe

[57] ABSTRACT

The rotor comprises, for each blade, an inner and an outer flap stop which are fixed to the blade and have a bearing surface which is planar with a cylindrical portion, facing an inner and an outer flap stop fixed to the hub and with torus-shaped bearing surfaces with their convexness facing towards the flap stops of the blade and in the shape of an arc of a circle centered on the axis of drag of the blade.

8 Claims, 6 Drawing Sheets

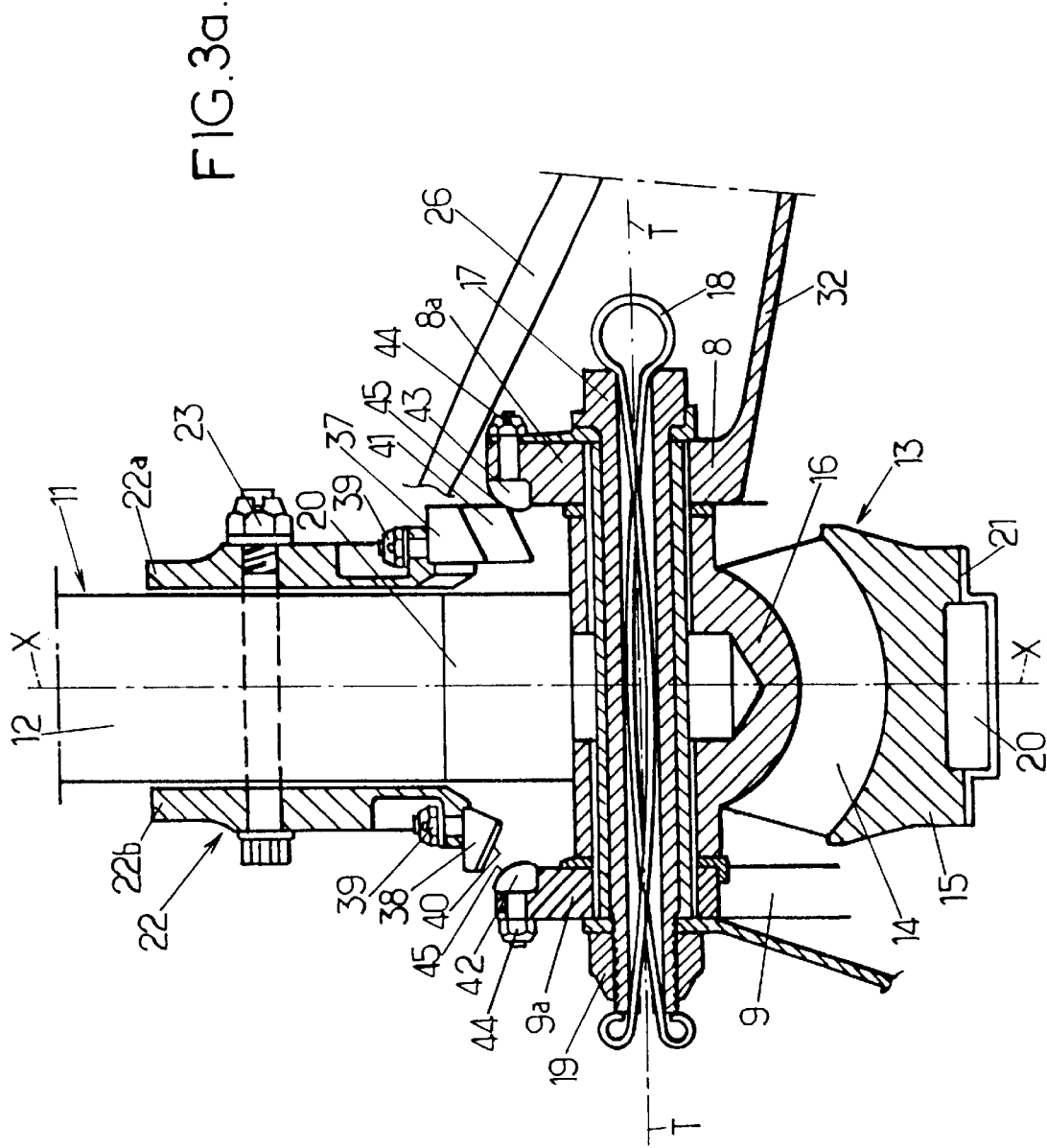

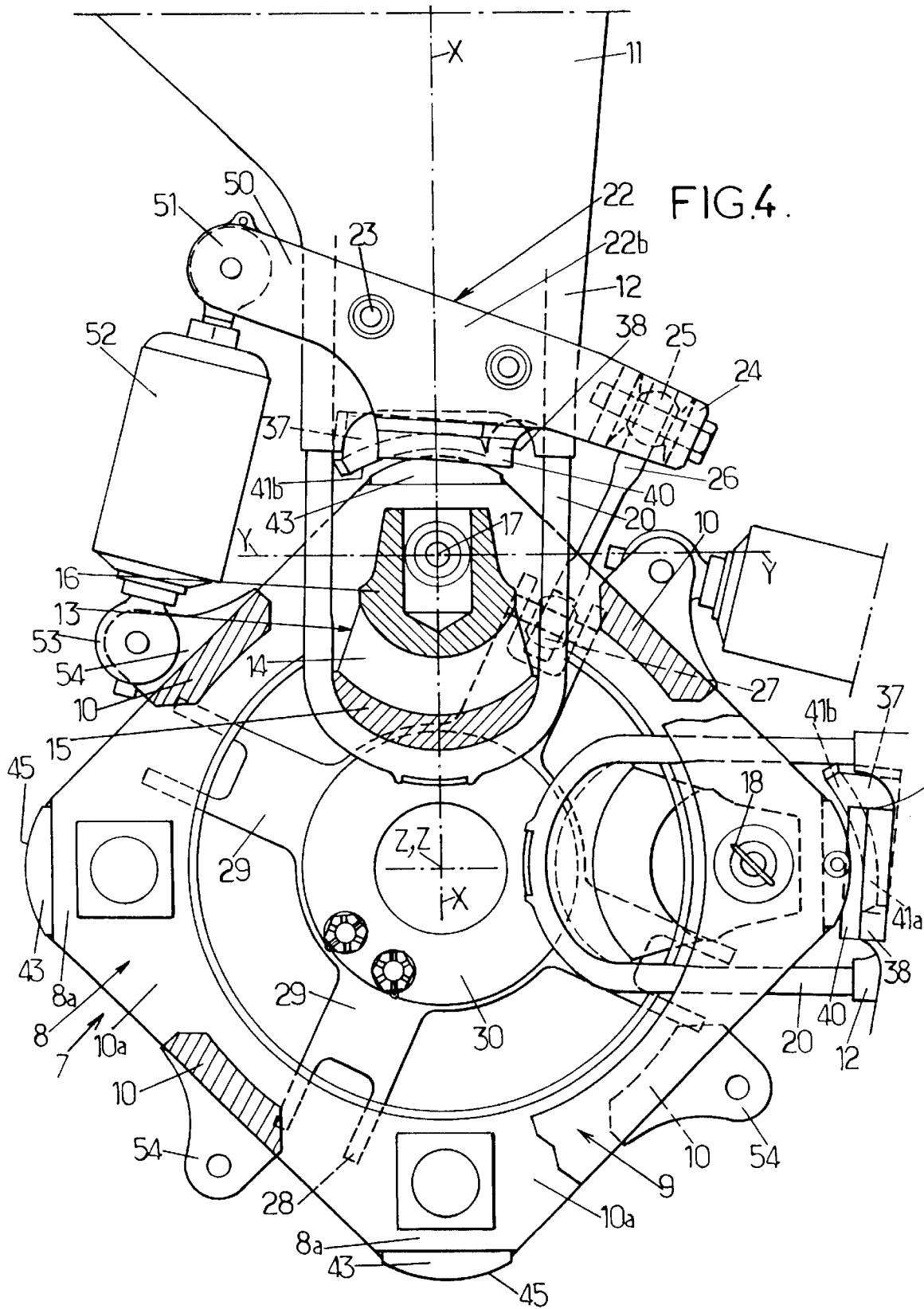

ROTORCRAFT ROTOR WITH FIXED FLAP STOPS ON BLADES AND HUB, AND WITH DETERMINED PITCH-FLAP LAW

The invention relates to rotorcraft rotors, especially helicopter rotors, which comprise flap stops in which stops fixed to the blades bear directly against stops fixed to the hub.

More specifically, the invention relates to a rotorcraft rotor, as described in U.S. Pat. No. 5,267,833, and in which the flap stops, of the above-mentioned type, are improved to allow a determined pitch-flap blade law to be obtained.

U.S. Pat. No. 5,267,833 discloses a rotorcraft rotor, such as a helicopter main or tail rotor, and which comprises:
a mast intended to be driven by its base in rotation about its axis, which is the axis of rotation of the rotor,
a hub, secured to the mast,
at least two blades, each of which has its root connected to the hub by retaining and articulation means, allowing angular travel of the blade in terms of pitch, in terms of flapping and in terms of drag about a longitudinal axis for changing the pitch of the blade, an axis of flapping and an axis of drag of the blade respectively, which three axes are perpendicular in pairs and meet at a centre of articulation of the retaining and articulation means, the axis of drag being approximately parallel to said axis of the rotor, and, for each blade,
a flap stops device in which inner fixed stops on the same side as the mast, and outer fixed stops on the opposite side to the mast and which are secured to the blade root bear directly against inner fixed stops and outer fixed stops respectively, which are secured to the hub, in order respectively to limit the negative and positive flappings of the blade, each of the inner and outer flap stops of the blade having a bearing surface at least a portion of which is planar, transverse with respect to the corresponding pitch axis and inclined to the axis of the rotor so that it approximately faces the respectively inner or outer stop of the hub, and in which device each flap stop of the hub is curved into an arc of a circle with the convexness facing radially outwards with respect to the axis of the rotor.

Figure 2:
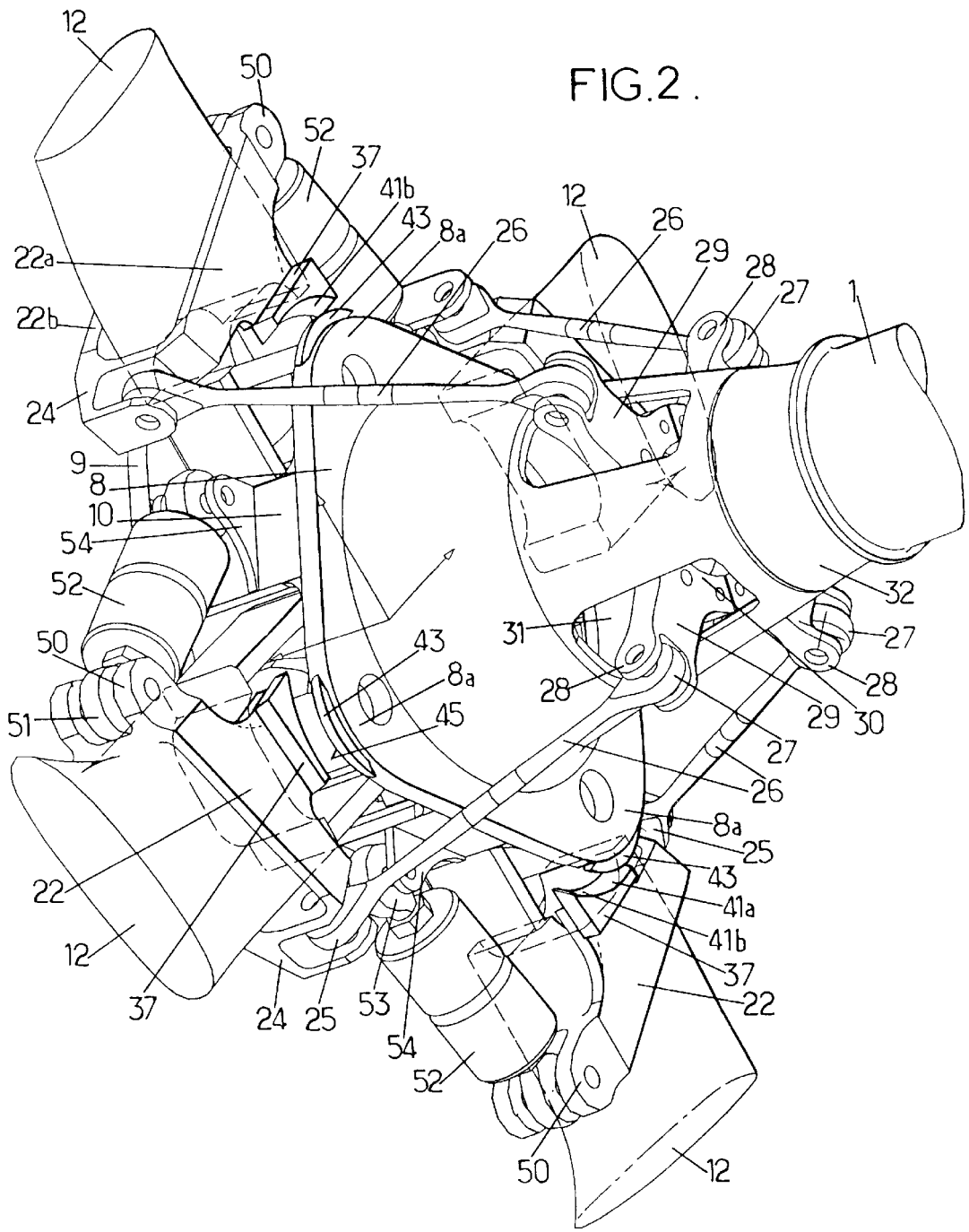
Figure 3:
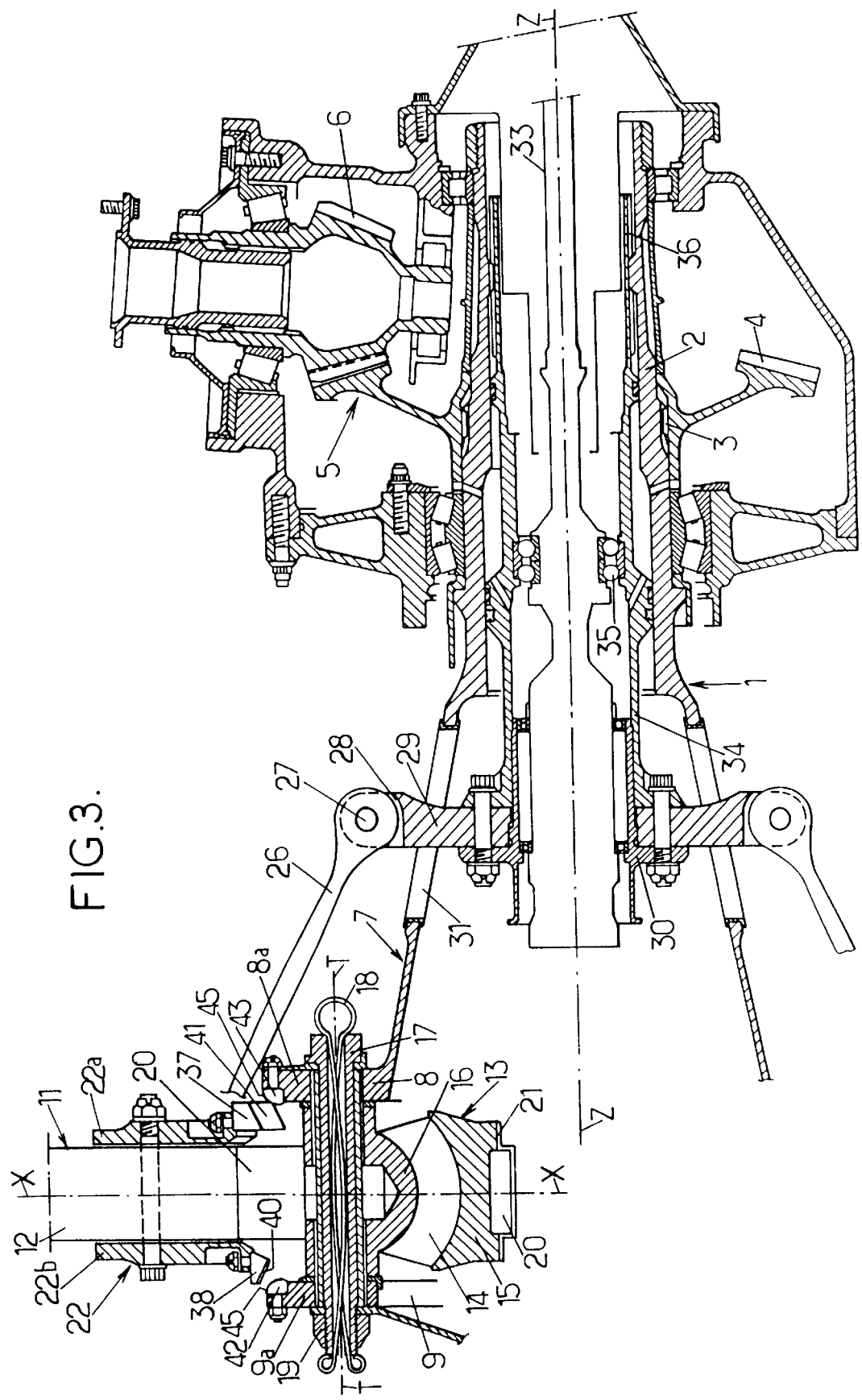

In the embodiment of FIGS. 1 to 3 of U.S. Pat. No. 5,267,833, the inner and outer flap stops of each blade, which are respectively bottom and top stops on a helicopter main rotor, are pads formed on bosses arranged respectively below and above an inner plate and an outer plate respectively which are fixed to the corresponding blade root, and these two pads have completely planar transverse and inclined bearing surfaces via which these pads come to bear directly against respectively inner and outer annular plates of the hub, these two hub plates being axially spaced apart so that the means for retaining and articulating the blades to the hub, and blade attachments connecting these means to the corresponding blades can be housed between them.

Thus, the inner and outer flap stops of the hub are directly parts of the outer, with respect to the rotor axis, edge of the inner and outer plates of the hub.

As these hub plates or rings are similar and have a cylindrical shape of circular or polygonal cross-section with rounded vertices, and as, in the latter case, the means of retaining and articulating each blade are retained between two rounded vertices facing each other on the inner and outer plates of the hub, this means that those parts of the edges of the plates forming inner and outer flap stops of the hub are rounded parts or parts in the shape of an arc of a circle with the convexness facing radially outwards with respect to the axis of the rotor, in a sectioning plane perpendicular to this axis of the rotor.

However, in a sectioning plane passing through the axis of the rotor, the edge of each plate against which the flap stops of the blades come to bear is in fact a sharp edge delimited by the intersection at right angles of the lateral face of the corresponding plate with its radial face that faces towards the other, inner or outer, hub plate.

This results in contact between a plane and a sharp edge in the form of an arc of a circle between an inner or outer flap stop of a blade and the corresponding inner or outer flap stop of the hub and this, bearing in mind the variable pitch that may be given to the blades of the rotor when stationary or rotating, and also bearing in mind the drag of the blades, does not make it possible to obtain a defined pitch-flap law when the flap stops of blades and of the hub are interacting, nor does it conserve a determined pitch-flap relationship when the drag of the blades varies.

The problem underlying the invention is that of overcoming this drawback on a rotorcraft rotor equipped with a flap stops device with direct bearing and stops fixed on the blades and on the hub, as known from U.S. Pat. No. 5,267,833, while at the same time retaining the simplicity of the structure and therefore the reliability of such a flap stops device.

Another object of the invention is to propose a device of flap stops fixed to blades and to the hub which changes in terms of pitch but not in terms of drag, and is well suited to a helicopter tail rotor, of simple compact, economical and reliable structure.

To this end, the rotorcraft rotor of the invention, of the type known from FR-A-2,671,049 and as explained hereinabove, is characterized in that each inner or outer flap stop of the hub has a bearing surface which is a portion of a torus-shaped surface, with convexity facing towards the opposite inner or outer flap stop belonging to a blade and which is centred on the axis of drag of said blade.

Thanks to this geometry of the torus-shaped bearing surface of the hub flap stops, a cam effect on the blade flap stops bearing surfaces is obtained, which surfaces can slide over the torus-shaped surfaces opposite, with mutual cooperation between inner flap stops, in negative flapping, or of outer flap stops, in positive flapping, and when the pitch of the blades is altered, so that a pitch-flap law determined by the geometry of the bearing surfaces of the stops contacting with one another can be preserved irrespective of blade drag, within a permissible drag range.

Advantageously, the inner flap stop of each blade comprises a bearing surface, the planar portion of which is extended, on one side of the corresponding pitch axis by a portion of cylindrical surface, so that in positive flapping, contact between the flap stops is contact of a planar surface against a torus-shaped surface, whereas in negative flapping, contact between the inner flap stops is contact of a planar or cylindrical surface against a torus-shaped surface.

This geometry is simple and suited to minimizing separation between the flap stops of the blades and those of the hub for given angular positions of the blades with respect to the hub, and it offers good compromises between these angular positions and the pitch-flap combinations. As an alternative, the portion of cylindrical surface may be extended, on the opposite side to the planar portion, by another planar portion.

According to a preferred embodiment, each inner or outer flap stop of the hub is approximately a quarter-torus segment.

As known from U.S. Pat. No. 5,267,833, the hub may comprise an inner plate and an outer plate which are approximately radial with respect to the axis of the rotor, and spaced apart along this axis, and between which said means of retaining and of articulating each blade are retained, in which case the inner and outer flap stops of the hub are advantageously fixed to the outer, with respect to the axis of the rotor, radial edges of the inner and outer plates respectively of the hub in those parts of said plates between which said retaining and articulation means are housed.

As also known from U.S. Pat. No. 5,267,833, the inner and outer plates of the hub may have shapes similar to polygonal plates with rounded vertices of which there are the same number as there are blades, and the means of retaining and articulating each blade may comprise a laminated spherical stop comprising an outer, with respect to the axis of the rotor, radial armature which is retained as a spacer piece between two rounded vertices facing each other of the two plates of the hub, in which case the inner and outer flap stops of the hub are fixed to the edges of the rounded vertices of the respectively inner and outer plates of the hub.

Advantageously, the inner and outer flap stops of the hub are attached and fixed in such a way as to be partially set into the edges of the rounded vertices of the inner and outer plates of the hub.

As far as the inner and outer flap stops of each blade are concerned, they may advantageously exhibit the following features:

these stops are fixed to the respectively inner and outer parts of a cuff surrounding the blade root and secured to said blade root, these stops are pads attached and fixed projecting from the inner, with respect to the axis of the rotor, radial edges of the respectively inner and outer parts of said cuff.

In a particularly advantageous application, the rotor of the invention is a helicopter tail rotor, and its hub comprises a frustoconical base converging towards the mast and connecting the hub to said mast, and the frustoconical base has openings through which the arms of a pitch-change spider, secured in rotation to the hub and mounted so that it can move axially in the frustoconical base pass, the end of each arm on the outside of the base being articulated to one end of a pitch rod which is articulated by its other end to a pitch lever of a respective blade of the rotor.

In this case, it is further advantageous for the pitch lever to project laterally from the cuff surrounding the corresponding blade root and carrying the inner and outer flap stops of this blade.

Further features and advantages of the invention will emerge from the description given hereinbelow, without implied limitation, of one embodiment which is described with reference to the appended drawings in which:

FIGS. 1 and 2 are diagrammatic perspective views, respectively from the outside and from the side in the case of FIG. 1, and from the inside and from the side in the case of FIG. 2, of the head of a helicopter four-bladed tail rotor, FIG. 3 is a diagrammatic part view in section on the axis of the rotor of FIGS. 1 and 2, FIG. 3a depicts, on a larger scale, a part of FIG. 3, FIG. 4 is a diagrammatic part view, partly in transverse section and partly in side elevation, of the rotor of FIGS. 1 to 3, and FIG. 5 depicts curves corresponding to the angular law of flapping as a function of the pitch, which law is obtained thanks to the rotor flap stops of FIGS. 1 to 4, when stationary and when rotating.

The head of the helicopter four-bladed tail rotor, which head is depicted in FIGS. 1 to 4, is produced with an overall architecture in accordance with the teachings of U.S. Pat. No. 5,267,833, to which reference can be made for further details regarding the production of the various components of the rotor head, and the description of which is incorporated into this descriptive text by reference, except as far as the technical features specific to rotors of the invention and which therefore differ from corresponding elements or components in rotors according to the aforementioned patent are concerned.

The rotor of FIGS. 1 to 4 comprises a tubular mast 1 which is mounted and driven in rotation about its longitudinal axis Z—Z which is the axis of rotation of the rotor, by its base 2 which has external axial splines 3 engaging with internal splines of the output pinion 4 of a bevel gear pair 5, the input pinion 6 of which is itself driven in rotation by a transmission shaft (not depicted) connected to the main transmission gearbox of the helicopter, in a way which is well known.

On the opposite side to its base 2, the mast 1 is secured in terms of rotation to a hub 7. This hub 7 is of the type which comprises two hub plates 8 and 9 which are parallel to one another, approximately perpendicular to the axis of the rotor Z—Z, spaced axially apart by an axial annular wall 10 (see FIG. 4), and which in plan view have the same shape of a polygon with rounded vertices comprising as many vertices as the rotor has blades. In this example, as the tail rotor is a four-bladed rotor, each of the hub plates 8 and 9 is a square ring with four rounded vertices and a circular central opening (FIG. 4).

The plate 8, on the same side as the mast 1, is called the inner plate, because it is situated on that side of the structure of the rear part of the helicopter on which the tail rotor is mounted to rotate, and the other plate 9 is the outer plate.

Each of the blades 11 of the rotor is connected by its root 12 to the hub 7 using a single retaining and articulation member which is a laminated spherical stop 13, of a well-known structure.

Each of these laminated spherical stops 13 comprises a central part 14 consisting of an alternating stack of layers of elastomer and of rigid cups, generally made of metal, in the form of spherical caps, each central part 14 being bonded between two rigid armatures 15 and 16 in a respectively inner and outer radial position with respect to the axis of the rotor Z—Z. In a known way, the central part 14 is bonded, on the one hand, by its convex inner radial face, to the concave outer radial face, of corresponding shape, of the inner armature 15 and, on the other hand, by its concave outer radial face to the convex inner radial face, of corresponding shape, of the outer armature 16. The latter is fixed as a spacer piece between two rounded vertices 8a and 9a facing each other on the two hub plates 8 and 9, using a bolted connecting spindle 17, which passes through aligned bores in the outer armature 16 and the rounded vertices 8a and 9a, and which is a tubular spindle through which there passes an elastic safety pin 18 for retaining a nut 19 which is screwed onto the threaded end of the spindle 17 projecting outside the outer plate 9.

The laminated spherical stop 13 thus retained between the two plates 8 and 9 of the hub 7 by its outer armature 16, is connected to the blade root 12 by an attachment which consists of a rigid loop 20 secured to the blade root 12 and which surrounds the laminated spherical stop 13 by being set into a housing in the inner radial face (relative to the axis Z—Z) of the inner armature 15 and retained in the set-in position by a plate 21 fixed by screwing against the internal armature 15. The loop 20 and the laminated spherical stop 13 are housed in an opening 10a in the wall 10 connecting the two hub plates 8 and 9, this opening 10a being formed between the rounded vertices 8a and 9a between which the stop 13 and the loop 20 are also housed. The dimensions of each of the four openings 10*a* in the wall 10 are sufficient to allow the angular travel of the inner armature 15 and of the loop 20 for attachment with the root 12 of the blade 11 in terms of pitch, flapping and drag, about a pitch axis, an axis of flapping and an axis of drag, respectively, which axes are perpendicular in pairs and meet at the centre of articulation of the laminated spherical stop 13, this centre of articulation lying geometrically on the same side as the outer armature 16, for example on the axis of the spindle 17. The pitch axis X—X is a longitudinal axis of the blade 11 which is approximately radial with respect to the axis Z—Z, while the axis of flapping Y—Y is perpendicular to the axes Z—Z and X—X, and the axis of drag T—T is approximately parallel to the axis of the rotor Z—Z.

As described in U.S. Pat. No. 5,267,833, the rigid blade-attachment loop 20, which runs continuously around the laminated spherical stop 13, the inner armature 15 of which is set into the loop 20, may be of composite structure, made up of inorganic or organic reinforcing rovings agglomerated by a synthetic stiffening resin, and may be secured to the framework of the blade 11, extending one or more bundles of rovings that constitute the spar or spars of the blade 11.

The pitch of each blade 11 is controlled using a fixture contrived as a cuff 22 surrounding the blade root 12 and fixed to the latter by two bolted connections 23 passing through the blade root 12 and the inner 22*a* and outer 22*b* plates of the cuff 22. This cuff 22 has, projecting laterally forwards from the leading edge of the blade root 12, a clevis mount 24 constituting a pitch lever, and in which there is retained a ball-joint articulation 25 at the outer end of a pitch rod 26, the inner end of which is also retained by a ball-joint articulation 27 in a clevis mount 28 at the outer, with respect to the axis of the rotor Z—Z, radial end of an arm 29 of a spider plate 30 for collectively changing the pitch of the blades 11 of the tail rotor.

Each of the arms 29, of which there are as many as there are rotor blades, passes radially through a respective one of an equal number of apertures 31 formed in a frustoconical base 32 of the hub 7, this base 32 converging towards the mast 1 and connecting the latter to the two plates 8 and 9 and to the partition 10 of the hub 7. The four apertures 31 are uniformly distributed in the periphery of the frustoconical base 32 and, as depicted in FIG. 4, are slightly offset in a circumferential direction with respect to the laminated spherical stops 13 so that the radial arms 29 can be connected to the pitch levers 24 outside the frustoconical base 32 by the pitch rods 26.

Inside the base 32, the spider 30 and its arms 29 bolted to it are simultaneously rotated with the mast 1 and can be moved along the axis of the rotor Z—Z over an axial travel that corresponds to the maximum pitch range, for which the axial dimensions of the apertures 31 in the base 32 are suited. In a known way, the axial movements of the spider 30 in the base 32 are controlled by a collective pitch control rod 33, itself moved by actuating means (not depicted) such as a mechanical transmission member with angle gear or a jack with yaw servocontrol. This rod 33 extends axially inside a sleeve 34 connected to the spider 30 and to which the rod 33 transmits its axial movements via a double-row thrust ball bearing 35 mounted between the central rod 33 and the sleeve 34, driven in rotation by the mast 1 and in the latter by the outer axial splines 36 engaged with the inner axial splines of the mast 1, in an assembly that is well known.

To limit negative flapping (inwards or towards the mast 1) of each blade 11 about its axis of flapping Y—Y, when stationary and at low rotor rotational speeds, and to limit positive flapping (outwards or away from the mast 1) of each blade 11, the rotor comprises, for each blade 11, a flap stops device with inner and outer fixed stops secured to the blade root 12 bearing directly against respective inner and outer stops fixed to the hub 7.

For each blade 11, the flap stops device comprises an inner stop 37 and an outer stop 38 which are each a pad attached and fixed by screws 39 projecting radially inwards, with respect to the axis of the rotor Z—Z, from the inner radial edge of the inner plate 22*a* and of the outer plate 22*b* respectively of the cuff 22 carrying the pitch lever 24 and fixed to the blade root 12. The two pads of stops 37 and 38 thus occupy fixed positions with respect to the blade 11. Each of the pads of stops 37 and 38 has a bearing surface which is more or less transverse with respect to the corresponding pitch axis X—X, and inclined to this axis and to the axis Z—Z of the rotor so that it approximately faces the outer (with respect to the axis of the rotor Z—Z) radial edge of the rounded vertex 8*a* or 9*a* of the hub plate 8 or 9 opposite. On the pad for outer stop 38, this bearing face 40 is a planar face, whereas on the pad for inner stop 37, this bearing face 41 comprises a planar portion 41*a*, essentially on the same side as the leading edge of the blade root 12 (see FIG. 4) which is extended, on the trailing-edge side of this blade root 12, by a portion of cylindrical surface 41*b* with the concaveness facing towards the corresponding rounded vertex 8*a* of the inner plate 8.

Facing the bearing surfaces 40 and 41 of the outer 38 and inner 37 stops pads of each blade 11, an outer flap stop 42 and an inner flap stop 43 are mounted fixed to the hub 7, each being set and partially housed in a recess formed in the outer (with respect to the axis Z—Z) radial edge of the corresponding rounded vertex 9*a* or 8*a*, and retained in position by screws 44. Each of the flap stops 42 and 43 of the hub is a pad with approximately the shape of a quarter-torus segment, having a bearing surface 45 which is a portion of torus-shaped surface with the convexness facing towards the inner 37 or outer 38 flap stop pad opposite on the cuff 22 of the corresponding blade 11, and this torus-shaped surface is also curved into an arc of a circle with the convexness facing radially outwards with respect to the axis Z—Z of the rotor, being precisely centred on the axis of drag T—T of the corresponding blade 11.

The centring on the axis of drag T—T of the torus-shaped bearing surfaces 45 of the outer 42 and inner 43 flap stops, in a plane perpendicular to the axis of the rotor Z—Z, is depicted in FIG. 4, while the convexness of each outer 42 and inner 43 stop pad and which faces towards the corresponding outer 38 or inner 37 flap stop pad of the blade, is depicted in FIG. 3. The shape, in plan view, of the quarter-torus segments forming the inner 43 flap stop pads set into the edge of the rounded vertices 8*a* of the inner plate 8 is visible in FIG. 4. FIGS. 1 and 2 show the setting of the quarter-torus segments into the edge respectively of the rounded vertices 9*a* of the outer plate 9 to form the outer flap stops 42 of the hub 7 (FIG. 1), and of the rounded vertices 8*a* of the inner plate 8 to form the inner flap stops 43 of the hub 7.

Figure 5:
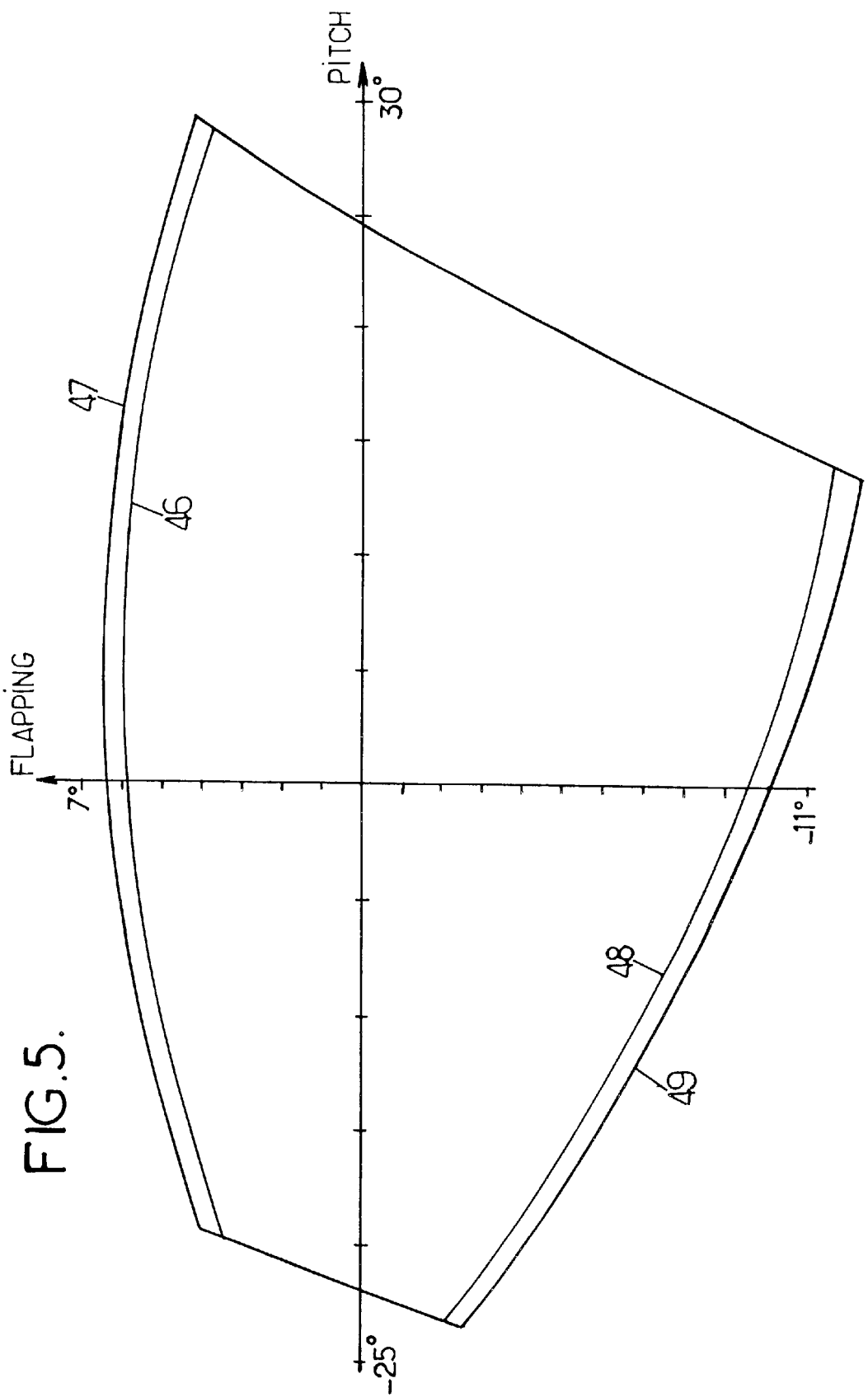

When an outer flap stop 38 of a blade 11 comes to bear via its bearing surface 40 against the torus-shaped bearing surface 45 of the corresponding outer flap stop 42 of the outer plate 9, to limit the positive flapping of this blade 11, and when the inner flap stop 37 of the blade 11 comes into contact via its bearing surface 41 against the torus-shaped bearing surface 45 of the corresponding inner flap stop 43 on the inner plate 8, to limit the negative flapping of this blade 11, there is a cam effect on the bearing surface 40 or 41 which slides over the torus-shaped bearing surface 45 opposite, when the pitch of the blade is altered, when stationary or when the rotor is rotating, and a pitch-flap angular law as depicted by the curves in FIG. 5 is obtained and is retained when the blade 11 moves in terms of drag, because of the special geometry of the bearing surfaces 40, 41 and 45 of the flap stops, and in particular because the torus-shaped bearing surfaces 45 of the flap stops 42 and 43 of the hub 7 are centred on the axis of drag T—T of the corresponding blade 11.

This means that the flap stops 37, 38, 43 and 42 are, for each blade 11, mounted respectively on the corresponding cuff 22 and on the corresponding rounded vertices 8a and 9a radially on the outside of the axis of drag T—T defined by the corresponding laminated spherical stop 13.

In FIG. 5, 46 and 47 depict the curves of the angular law expressing the flapping, on the ordinate axis, as a function of the pitch, on the abscissae, and throughout the range of pitch, by the contact between plane and torus-shaped surface upon interaction between the outer flap stops 32 and 42, respectively when the rotor is stationary (curve 46) and when it is rotating (curve 47).

Likewise, curves 48 and 49 depict, respectively when the rotor is stationary and when it is rotating, the angular law representing the flapping as a function of the pitch when the planar portion 41a of the bearing surface 41 of the inner flap stop 37 of a blade 11 is bearing against the torus-shaped bearing surface 45 of the corresponding inner flap stop 43 of the hub 7, disregarding the cylindrical portion 41b via which contact between cylindrical surface and torus-shaped surface is obtained. The differences between curves 46 and 48 when the rotor is stationary, on the one hand, and curves 47 and 49, when the rotor is rotating, on the other hand, are the result of the compressive deformation, as the rotor rotates, of the central parts 14 of the laminated spherical stops 13 which means that the angular excursion in flapping of a blade 11, experiencing the centrifugal forces of the rotation of the rotor, is greater than it is when the rotor is stationary.

Finally, as also known from U.S. Pat. No. 5,267,833, each cuff 22 comprises, projecting laterally from the opposite side to the pitch lever 24, another clevis mount 50 in which there is retained a ball-joint articulation 51 at one end of a drag damper 52, also known as elastic return strut with built-in damper, or frequency adaptor, the other end of which is retained by another ball-joint articulation 53 on a support 54 fixed laterally projecting outwards from a wall portion 10 between two adjacent openings 10a made in this wall 10 for housing the laminated spherical stops 13 and the corresponding loops 20 of two adjacent blades of the rotor.

In this example, the mast 1 and the hub 7 with its plates 8 and 9, its wall 10 and its base 32 form a monobloc tubular mast-hub, made as one piece of metal, and each rigid blade-attachment loop 20 originates directly from the corresponding blade root 12.

However, the invention is not restricted to this embodiment and, as described in U.S. Pat. No. 5,267,833, the mast and the various parts of the hub 7 may be made of metal or of composite and assembled by bolting and/or the hub 7 may be a hub with just one radial plate pierced with axial cavities of which there are as many as there are blades in order to house, in each cavity, a laminated spherical stop for retaining and articulating a blade, connected to this stop either directly by a forked part at the root of the blade or by a cuff fitted with an outer clevis mount in which the blade root can be retained by two spindles, in a way which is well known.

In the case of a hub with two plates, the connection between each blade and the corresponding laminated spherical stop may also be provided by a cuff with a clevis mount connecting to the blade root and exhibiting the rigid loop 20 which surrounds the laminated spherical part. Furthermore, the drag dampers may also be mounted as inter-blade ties.

What is claimed is:

1. A rotor for a rotorcraft of the type comprising:
   a mast intended to be driven by a mast base in rotation about a mast axis, which is the axis of rotation of the rotor,
   a hub, secured to the mast,
   at least two blades, each of which has a blade root connected to the hub by retaining and articulation means, allowing angular travel of the blade in terms of pitch, in terms of flapping and in terms of drag about a longitudinal axis for changing the pitch of the blade, an axis of flapping and an axis of drag of the blade respectively, which axes are perpendicular in pairs and meet at a center of articulation of said retaining and articulation means, the axis of drag being approximately parallel to said axis of the rotor, and, for each blade,
   a flap stops device in which inner fixed stops on the same side as the mast, and outer fixed stops on the opposite side to the mast and which are secured to the blade root bear directly against inner fixed stops and outer fixed stops respectively, which are secured to the hub, in order respectively to limit the negative and positive flappings of the blade, each of the inner and outer flap stops of the blade having a bearing surface at least a portion of which is planar, transverse with respect to the corresponding pitch axis and inclined to the axis of the rotor so that said blade flap stop approximately faces a corresponding respective inner or outer stop of the hub, and in which device each flap stop of the hub is curved into an arc of a circle with a convexness facing radially outwards with respect to the axis of the rotor,
   wherein each inner or outer flap stop of the hub has a bearing surface which is a portion of a torus-shaped surface, with convexity facing towards the opposite inner or outer flap stop belonging to a blade and which is centered on the axis of drag of said blades
   wherein each inner or outer flap stop of the hub is substantially a quarter-torus segment,
   wherein the inner flap stop of each blade comprises a bearing surface, the planar portion of which is extended, on one side of the corresponding pitch axis by a portion of cylindrical surface.

2. Rotor according to claim 1, wherein the hub comprises an inner plate and an outer plate which are substantially radial with respect to the axis of the rotor, and spaced apart along the axis of the rotor, and between which the said means of retaining and of articulating each blade are retained, and the inner and outer flap stops of the hub are fixed to the outer, with respect to the axis of the rotor, radial edges of the inner and outer plates respectively of the hub in parts of said plates between which said retaining and articulation means are housed.

3. Rotor according to claim 2, wherein the inner and outer plates of the hub have shapes similar to polygonal plates with rounded vertices of which there are the same number as there are blades, and the means of retaining and articulating each blade comprise a laminated spherical stop comprising an outer, with respect to the axis of the rotor, radial armature which is retained as a spacer piece between two rounded vertices facing each other on the two plates of the hub, the inner and outer flap stops of the hub being fixed to the edges of the rounded vertices of the respectively inner and outer plates of the hub.

4. Rotor according to claim 3, wherein the inner and outer flap stops of the hub are attached and fixed in such a way as to be partially set into the edges of the rounded vertices of the inner and outer plates of the hub.

5. Rotor according to claim 1, wherein the inner and outer flap stops of each blade are fixed to the respectively inner and outer parts of a cuff surrounding the blade root and secured to said blade root.

6. Rotor according to claim 5, wherein the inner and outer flap stops of each blade are pads attached and fixed projecting from the inner, with respect to the axis of the rotor, radial edges of the respectively inner and outer parts of said cuff.

7. Rotor according to claim 1, said rotor being a helicopter tail rotor, and whrein said hub comprises a frustoconical base converging towards the mast and connecting the hub to said mast, and the frustoconical base has openings through which arms of a pitch-change spider, secured in rotation to the hub and mounted so that said spider can move axially in the frustoconical base pass, the end of each arm on the outside of the base being articulated to one end of a pitch rod which is articulated by an other end to a pitch lever of a respective blade of the rotor.

8. Rotor according to claim 7, wherein said pitch lever projects laterally from a cuff surrounding the corresponding blade root and carrying said inner and outer flap stops of said blade.

* * * * *